US006426708B1

(12) United States Patent
Trajkovic et al.

(10) Patent No.: US 6,426,708 B1
(45) Date of Patent: Jul. 30, 2002

(54) SMART PARKING ADVISOR

(75) Inventors: Miroslav Trajkovic, Ossining; Srinivas Gutta, Buchanan; Vasanth Philomin, Briacliff Manor, all of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/895,149

(22) Filed: Jun. 30, 2001

(51) Int. Cl.[7] .................................................. B60Q 1/48

(52) U.S. Cl. ..................... 340/932.2; 340/933; 340/937

(58) Field of Search .............................. 340/932.2, 933, 340/937, 990

(56) References Cited

U.S. PATENT DOCUMENTS

| | | | |
|---|---|---|---|
| 4,949,277 A | 8/1990 | Trovato et al. | 364/513 |
| 5,083,256 A | 1/1992 | Trovato et al. | 364/148 |
| 5,712,830 A | 1/1998 | Ross et al. | 367/93 |
| 6,107,942 A * | 8/2000 | Yoo et al. | 340/932.2 |
| 6,147,624 A * | 11/2000 | Clapper | 340/932.2 |
| 6,243,029 B1 * | 6/2001 | Tomer | 340/932.2 |
| 6,285,297 B1 * | 9/2001 | Ball | 340/932.2 |
| 6,292,110 B1 * | 9/2001 | Budnovitch | 340/932.2 |

* cited by examiner

*Primary Examiner*—Daryl Pope
(74) *Attorney, Agent, or Firm*—Edward W. Goodman

(57) ABSTRACT

A parking advisor images scenes of a parking area and identifies free spaces using image processing techniques. The advisor then makes recommendations as to which areas a driver should go based on the locations of free spaces. One way of outputting the recommendations is to display them on a terminal at an entry gate or to print them on a ticket, receipt, or other piece of paper. An entry terminal may be provided to allow the user to enter a preferred destination served by the parking area. For example, the destination could be a particular airline terminal or department store. The advisor may select, among the free spaces identified, those that are most convenient to the destination and provide corresponding directions.

10 Claims, 8 Drawing Sheets

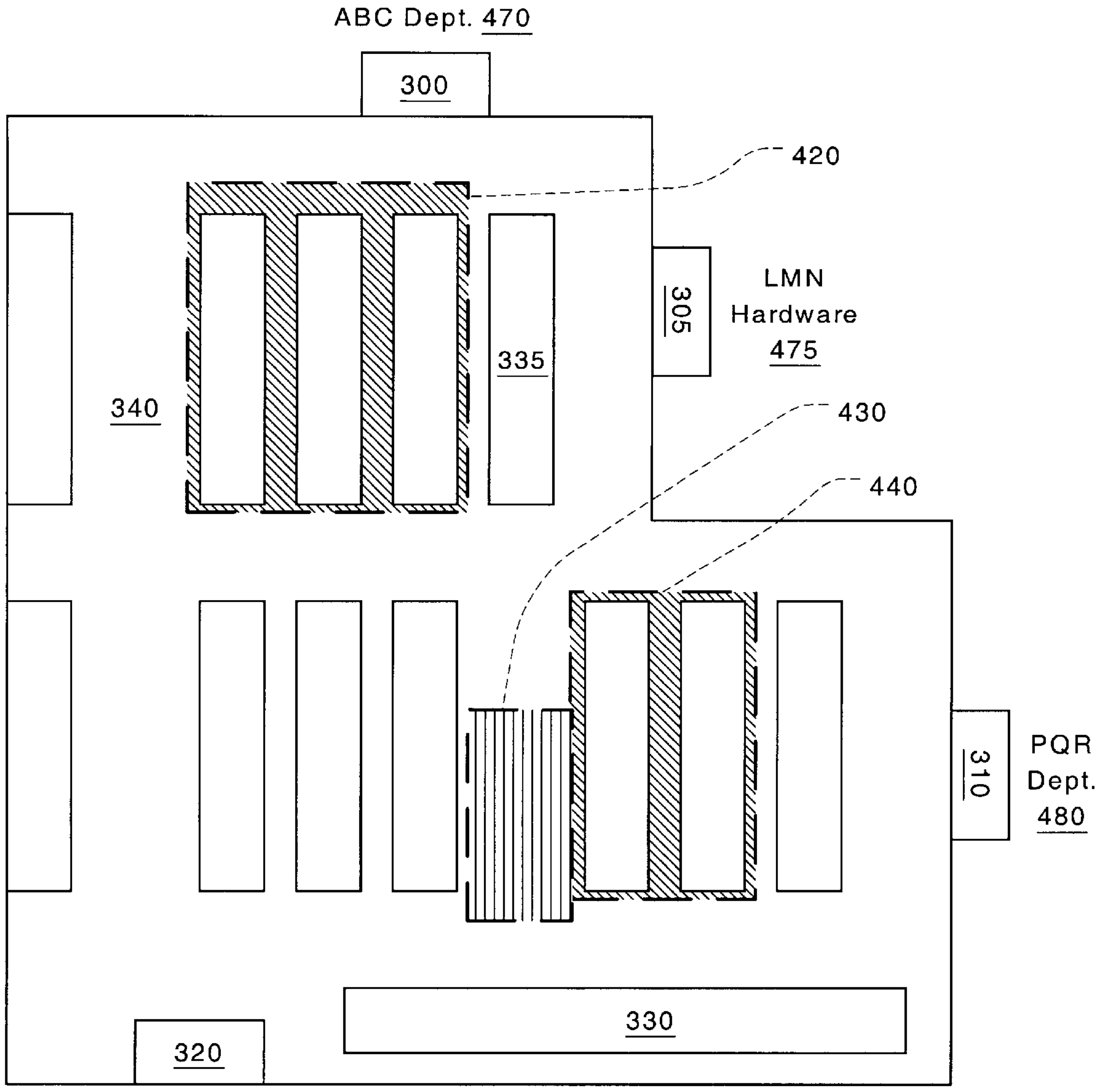
Fig. 10
Fig. 10A
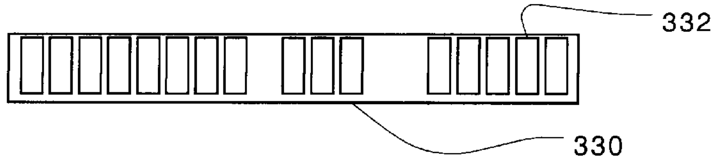

SMART PARKING ADVISOR

BACKGROUND OF THE INVENTION

1. Field of the Invention

The invention relates to automated systems for determining optimal parking locations in a parking area to minimize the searching time a driver spends looking for a parking space and to identify the most appropriate parking area for a specified destination.

2. Description of the Related Art

Parking can be a frustrating task, particularly in a large parking area with multiple levels. A driver's view of a parking area is limited at any time by the driver's low elevation and the occultation of vehicles. Drivers must usually resort to driving around for some time looking for a space. Also, ideally, drivers know the part of a parking area in which they should park given their ultimate destination, whether it be a store at a mall, a terminal at an airport, or a gate at a stadium. However, often the driver does not know the best place to park, apart from the availability of space, which the driver can find by hunting.

Surveillance systems are known in which images from remote cameras are gathered in a specific location and monitored by human observers. Also known are automated systems for face-recognition, gesture recognition for control of presentation devices, such as, audio visual presentation equipment or a speaker-following video camera.

U.S. Pat. No. 5,712,830, which is hereby incorporated by reference as if fully set forth herein in its entirety, describes a system for monitoring the movement of people in a shopping mall, in the vicinity of an ATM machine, or in other public spaces, using acoustical signals. The system detects acoustical echoes from a generator and indicates abnormal conditions. For example, movement may be detected at night in a secure area and an alarm generated. Also, by providing vertical threshold detection, the system may be used to distinguish adults and children. Movement may be detected by identifying patterns of holes and peaks in return echoes. The applications contemplated are detection of shoplifting, queues, running people, shopper headcount, disturbances or emergencies, and burglary.

U.S. Pat. No. 6,243,029 describes a system that uses cameras for billing vehicle users in a parking lot. The invention includes providing indicia for a toll parking location and unique indicia for a vehicle to be positioned in that parking location. The user notifies a remote central control unit the location indicia, the vehicle unique indicia, and the start time of parking the vehicle in the location. Later, the user notifies the remote central control unit of the vehicle unique indicia, and the finish time of parking the vehicle in the location. The remote central control unit then assesses a fee to the user for the duration of time the vehicle occupied the parking location. A method of monitoring parked vehicles to assure compliance with toll parking regulations is also disclosed. A camera device with an optical character recognition capability photographs the vehicle indicia, transmits data to and receives data from the remote central control unit to ensure vehicle compliance with regulations. A ticket is issued to those vehicles violating the parking regulations. The camera device also makes a pictorial record of the violation.

U.S. Pat. No. 6,107,942, which is hereby incorporated by reference as if fully set forth in its entirety herein, describes a parking guidance and management system. The system provides graphical information regarding the relative availability of parking spaces within a parking garage or other large facility. The system relies on a video image sensing system wherein each space in the facility is monitored by a camera to determine whether or not it is occupied. A single camera may be used to determine the status of a plurality of spaces. The information is displayed at strategically located displays along the way to available spaces.

There is a need in the art for a mechanism for detecting information about the locations of free parking spaces and for conveying appropriate information to a driver upon arrival at a parking facility. There is a further need for using free parking space information together with destination information to advise a river of where to go in a parking facility.

SUMMARY OF THE INVENTION

Briefly, one or more video cameras are placed in parking area so as to image scenes in which cars are parked. The scenes are analyzed to determine information such as the areas with the highest density of free parking space, the number of cars searching in a given area, the traffic flow in the parking facility, etc. This information is analyzed and used to help guide drivers to the most convenient parking space for their destination.

According to various embodiments, the invention may provide a printed map of a parking facility indicating where the free spaces are located. It can accept an indication of the user's destination, such as a terminal or store, and indicate the best locations based on both space availability and distance to the destination. Rather than illustrate free spaces on a space-by-space basis, preferably, the map shows space density to indicate where most of the spaces can be found.

User interfaces may be fixed or portable. The navigation information may be delivered via a website, permitting users to employ their own wireless terminals. Data may be displayed as a real-time map with an overlay of symbols indicating traffic flow, congestion, empty space density, and other information. Alternatively, a map may be distorted to illustrate the travel time between locations based on current traffic flow. Also, alternatively, the real-time data may be displayed as a short message making recommendations based on indicated desires, such as, the destination of the user.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 10 is an illustration of a map with navigation information overlaid thereon suitable for displaying or printing for implementing yet another embodiment of the invention;

FIG. 10A is an illustration showing an alternative type of overlay indicating parking space utilization that may be used with any of the embodiments of FIGS. 7–10.

DESCRIPTION OF THE PREFERRED EMBODIMENTS

Figure 1:
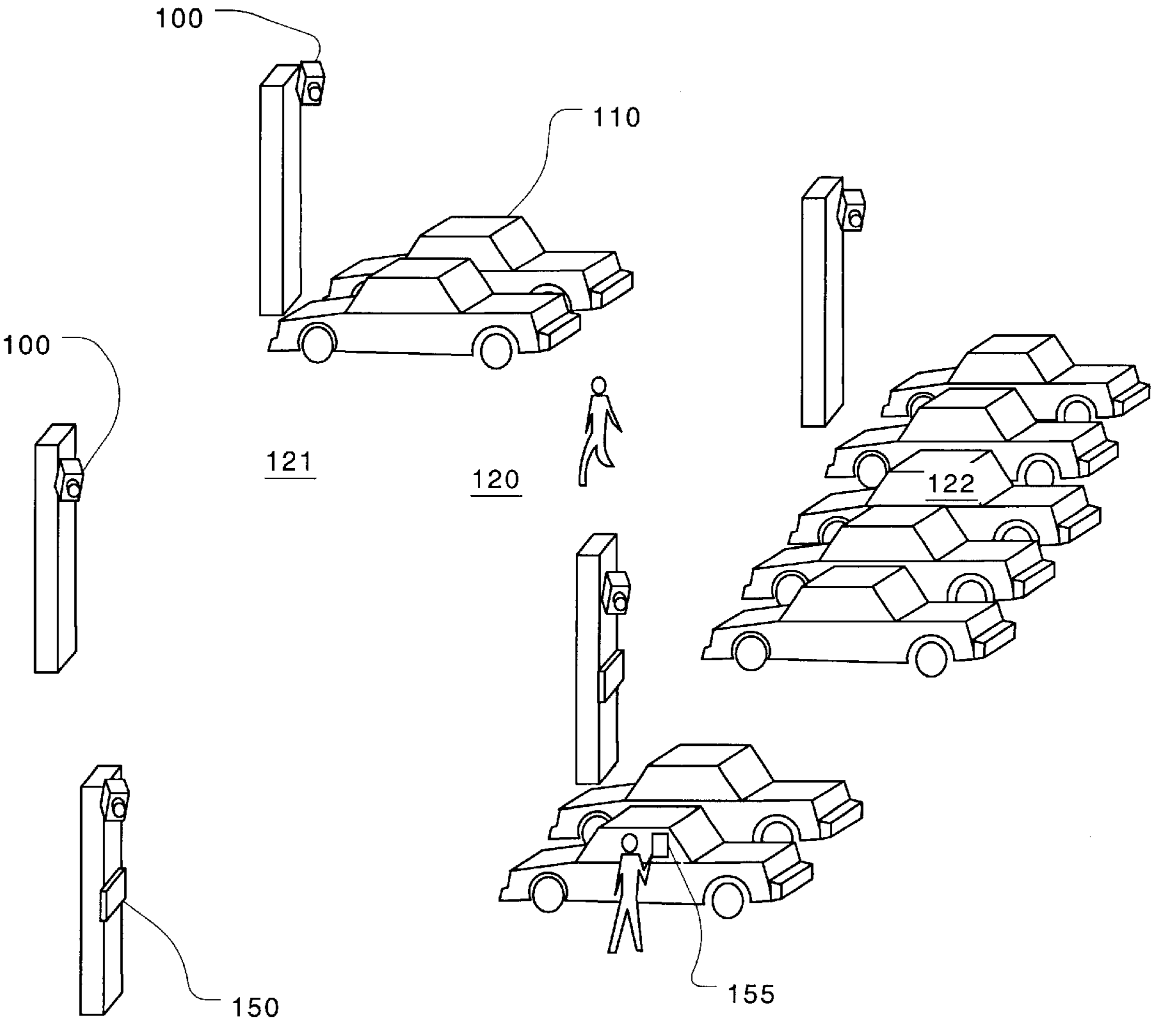
FIG. 1 is perspective view of a parking area space with video camera monitoring equipment and display terminals located throughout.

Referring to FIG. 1, a parking area 120, with cameras 100 mounted at various locations throughout, is monitored for vehicle space availability. Each camera 100 is aimed to view a portion of the parking area 120 such that every space in the entire parking area falls in the view of at least one respective camera 100. Each camera preferably views more than one space, making installation much easier. Well-known image classification techniques, such as, background subtraction, object counting, etc., may then be employed to determine the vehicle space density.

Information about parking availability, directions to the best parking spaces, etc., may be provided to the users by fixed terminals 150, portable wireless terminals, such as, Internet browser terminals 155, a terminal (not shown) installed in the vehicle 110, or printed on a parking ticket (not shown). As illustrated figuratively, at least one area of the parking lot is characterized by high parking density 122 and at least another by low parking density 121.

Figure 2:
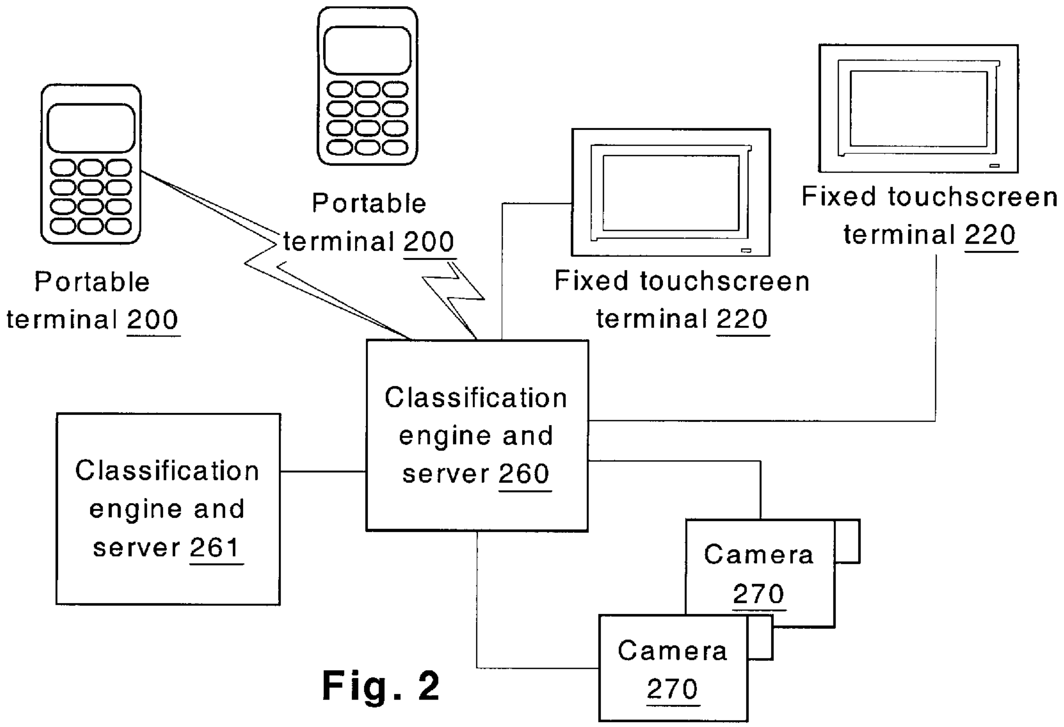
FIG. 2 is a block diagram of a hardware environment for implementing an automated parking monitoring system according to an embodiment of the invention.

Referring to FIG. 2, an infrastructure that provides a smart parking advisor may include one or more fixed and/or portable terminals 200 and 220, respectively. These may be connected to a classification engine and server 260 by wireless or wired data links. The classification engine and server 260 may be connected to one or more cameras 270 such as, CCD cameras. The classification engine and server 260 may be connected to one or more other classification engines and servers 261 (with additional terminals and cameras) to share data with other locations or the system could be centralized with only one classification engine and server 260, with all cameras and terminals connected to it. The classification engine and server 260 receives raw video data from the one or more cameras 270 and uses it to generate a real-time indicator of patterns, such as, crowd density by region. This data is further utilized by a user interface process running on the classification engine and server 260 for selective display responsive to user commands on the terminals 200 and/or 220.

Figure 3:
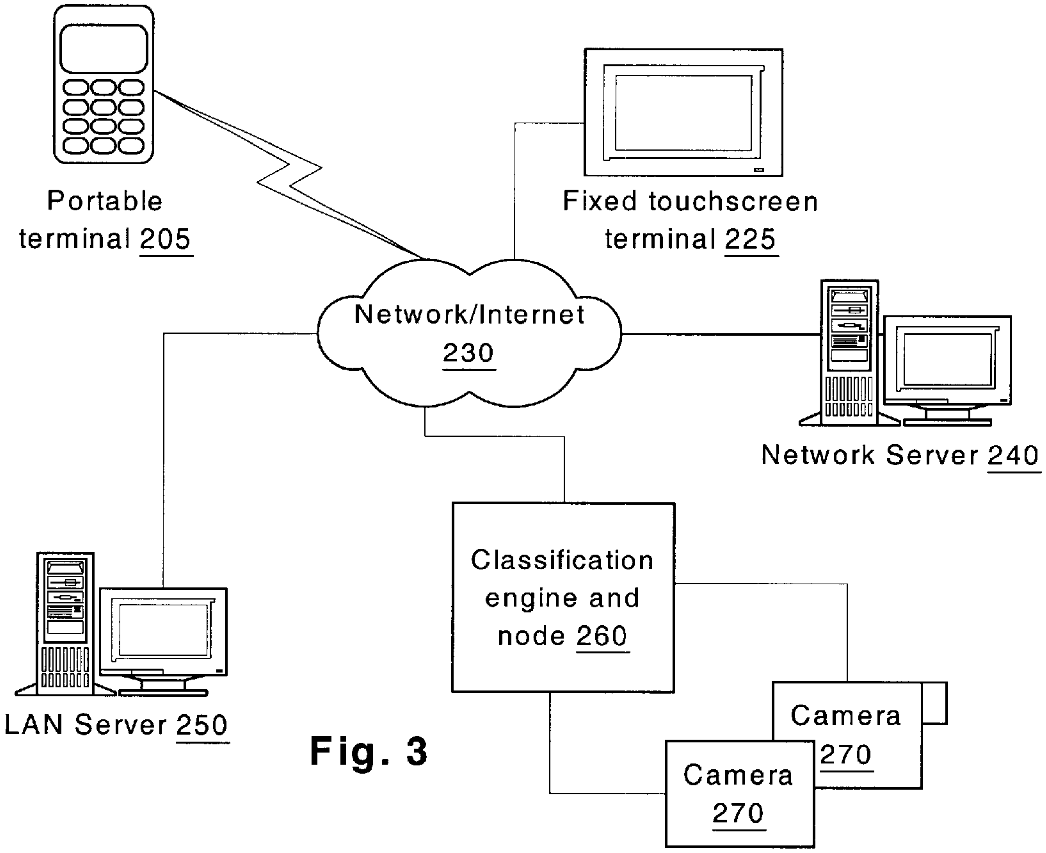
FIG. 3 is a block diagram of a hardware environment for implementing an automated parking monitoring system according to another embodiment of the invention.

Referring now to FIG. 3, data generated by a classification engine and node 260 is provided to servers, such as, network server 240 and/or 250, which generate user interface processes in response to request from the terminals such as, a portable terminal 205 and a fixed terminal 225. The terminals 205, 225 may be Internet or network terminals connected to the server(s) 240 and or 250 by a network or the Internet. For example, if the terminals 205, 225 ran World Wide Web (WWW) client processes, the network servers 240, 250 could provide the data requested through those processes by means of dynamic web sites using well-known technology. In this manner, the terminals need only be Internet devices and various different user interface server processes may be established to provide for the needs of the various types of terminals 205, 225. For example, portable devices with small screens could receive text or audio output and larger terminals could receive map displays and/or the inputs tuned to the types of input controls available.

The problem of determining the flow and presence of vehicles and their number in any given area of a scene captured by a camera is a routine one in terms of current image processing technology. For example, vehicles 110 can be resolved in a scene by known image processing and pattern recognition algorithms. One simple system selects the silhouettes of objects in the scene after subtracting the unchanging background and recognizes the features of the objects. The movement of each identified object can then be counted as they pass through an imaginary window 310 to determine the number of vehicles present and the traffic flow through the window. This can be done in an even simpler way by resolving the movement of valleys (background) and peaks (non-background) in a mosaic-filtered image where the resolution of the mosaic is comparable to the size of the vehicles present. Many different ways of counting individuals in a scene are possible and known in the art. Therefore, the subject will not be developed at length here. Note that an overhead view can be used for counting individual vehicles just as can an oblique view such as shown in FIG. 1. In the overhead view, the calculation of number and flow can be even easier because the area of non-background can be probabilistically linked to a number of individuals and the velocities of the corresponding blobs determined from motion compensation algorithms such as used in video compression schemes. The direction and speed of the vehicles can be determined using video analysis techniques. These examples are far from comprehensive and a person of skill in the art of image analysis would recognize the many different ways of counting vehicles and their movements and choose according to the specific feature set required for the given application.

Image processing and classification may also be employed to determine the delays suffered by vehicles in a congested area of a parking lot, for example, the average speed of vehicles or the size of a queue. A classification engine may be programmed to recognize queues of vehicles, for example, a lineup of cars trying to get to the same small number of spaces. Thus, even if a number of spaces is available, a large number of vehicles moving in the vicinity of those spaces with a declining number of empty spaces would recommend against advising a user to go to those spaces.

Figure 4:
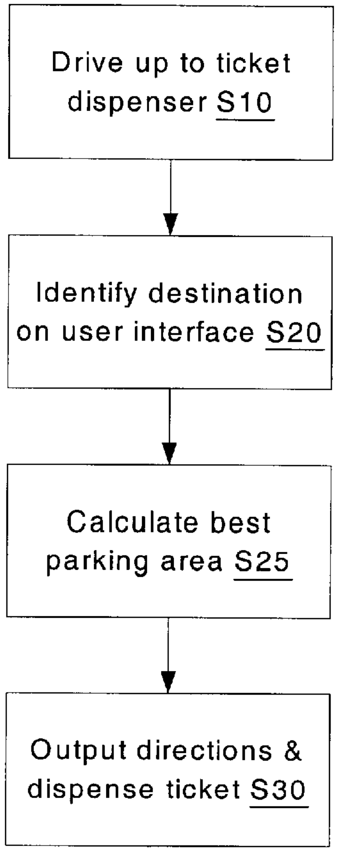
FIG. 4 is a flowchart indicating a procedure for providing a parking assistant according to an embodiment of the invention.

The optimal destination and route that the smart advisor generates constitutes a path-planning problem. Any algorithm that minimizes some cost parameter may be used to identify the directions to be given to the user. Referring to FIG. 4, the user may indicate a destination on a user interface, which could be a fixed terminal 220 or a portable one 200. A fixed terminal 220 could, for example, be located at the entry of a parking lot where the user picks up a parking ticket (S10). The terminal may be programmed to accept an indication of a destination, for example, the terminal of an airport, one of the main stores at a shopping mall, or a street to exit on (S20). The shortest and fastest path to the destination involves a number of links between nodes. The first node is the gate at which the user enters the parking area. The next nodes are locations between paths that can be driven to get to the various possible parking spaces that are open. The next nodes are those paths that make up a walking route from the possible parking spaces and the destination. The costs involve driving distance, probability of finding a free space, and walking distance, taking into account traffic congestion in the lot and rate of change of vehicle density in a given area. The cost may simply be time, but this can only be calculated probabilistically since there is a chance that a destination space, which is a node along one optimal route, will be occupied by the time the driver gets there. Thus, the routing algorithm should send the user to locations that have a number of alternatives. Thus, one ideal spot may be forsaken if there are many near-ideal spots at a substantially different location.

To define the least cost path planning problem, then, in terms of this probability of being deprived of a space, one may define the parking destination node as an area with a number of spaces and define a parameter that takes account of the probability that no space will be found in that area. Thus, the cost associated with a particular area of the parking lot may be inversely related to the density of free spaces. The costs of getting to nodes can also take account of the flow of vehicular traffic in ways that are well-described in the prior art.

A robust approach to such a cost-minimization problems is A* path planning, which can also deal efficiently with the problem of dynamically updating a least-cost path when conditions change. Dynamic programming is also a robust method for solving such problems. Other methods are also known in the art. A* is described in the following patents and applications, which are hereby incorporated by reference as if fully set forth in their entireties herein: U.S. Pat. No. 5,083,256 for "Path Planning with Transition Changes", K. Trovato and L. Dorst, issued Jan. 21, 1992 and filed Oct. 17, 1989; U.S. Pat. No. 4,949,277 for "Differential Budding: Method and Apparatus for Path Planning with Moving Obstacles and Goals", K. Trovato and L. Dorst, issued Aug. 14, 1990 and filed Mar. 10, 1988; and U.S. patent application Ser. No. 07/123,502 for "Method and Apparatus for Path Planning", L. Dorst and K. Trovato, filed Nov. 20, 1987.

Figure 6:
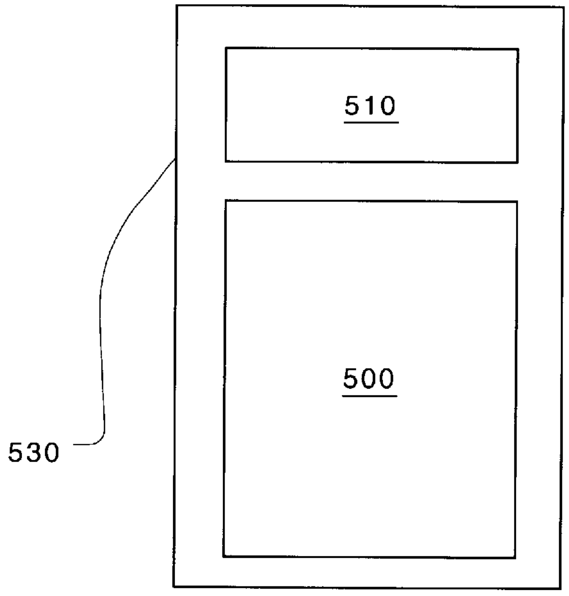
FIG. 6 is an illustration of a parking ticket, receipt, or other document with instructions or other data for implementing an embodiment of the invention.

At the terminal 220/200, the best parking area, in terms of the least cost path, is then computed at step S25. Then, in step S30, directions to the best parking area are output to the user. The latter may take the form of a map or text directions displayed on the terminal or output as speech. Referring to FIG. 6, another way of outputting the directions, for example, a map 500, is on a parking ticket 530 along with the usual printed record 510. In a simple embodiment, a lighted arrow could direct the driver to his/her destination. The cameras could track the vehicle and trigger additional directional arrows at the turning points. Many alternatives for giving directions are possible within the scope of the invention.

Figure 7:
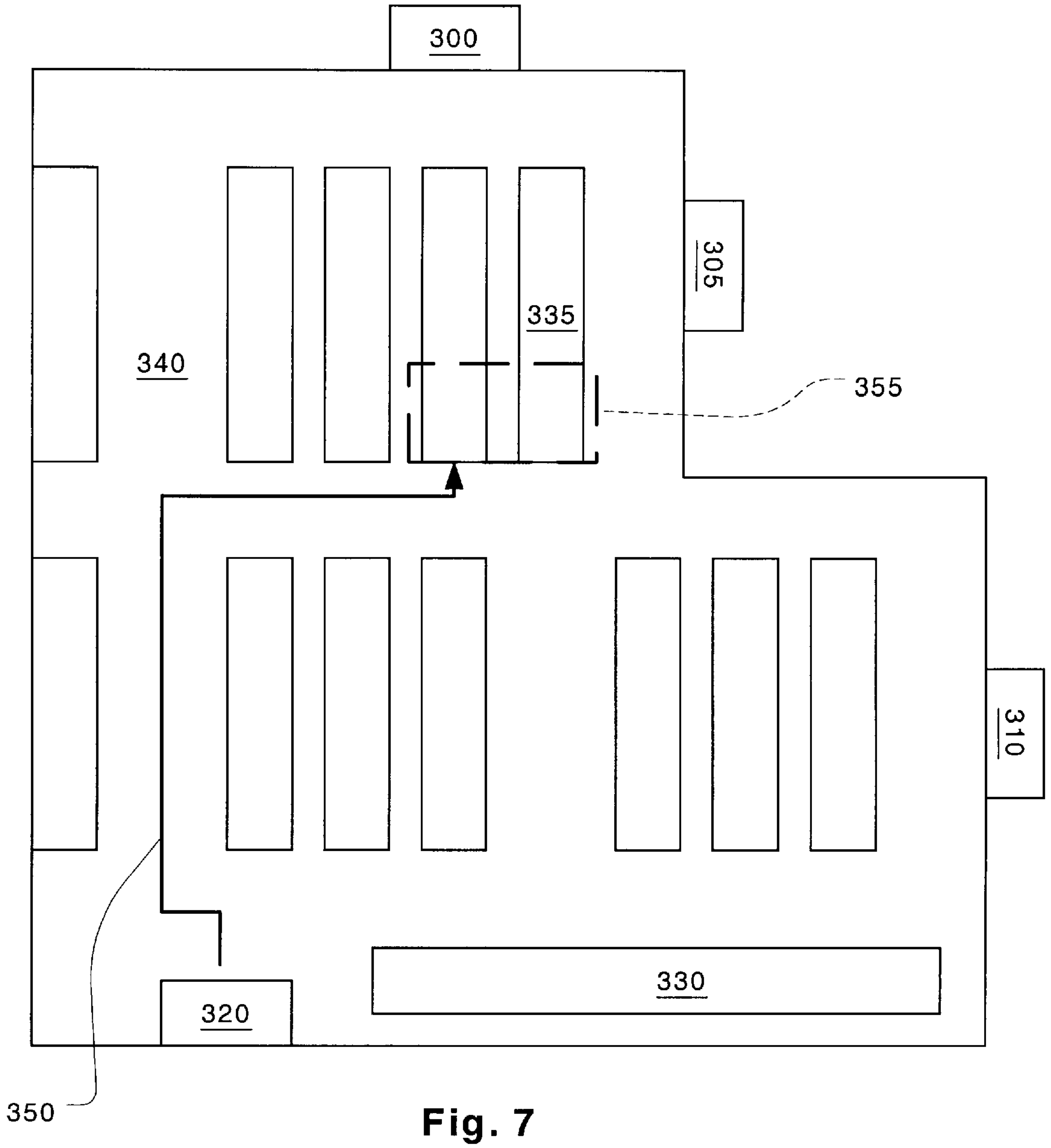
FIG. 7 is an illustration of a map with directions overlaid thereon suitable for displaying or printing for implementing an embodiment of the invention.
Figure 8:
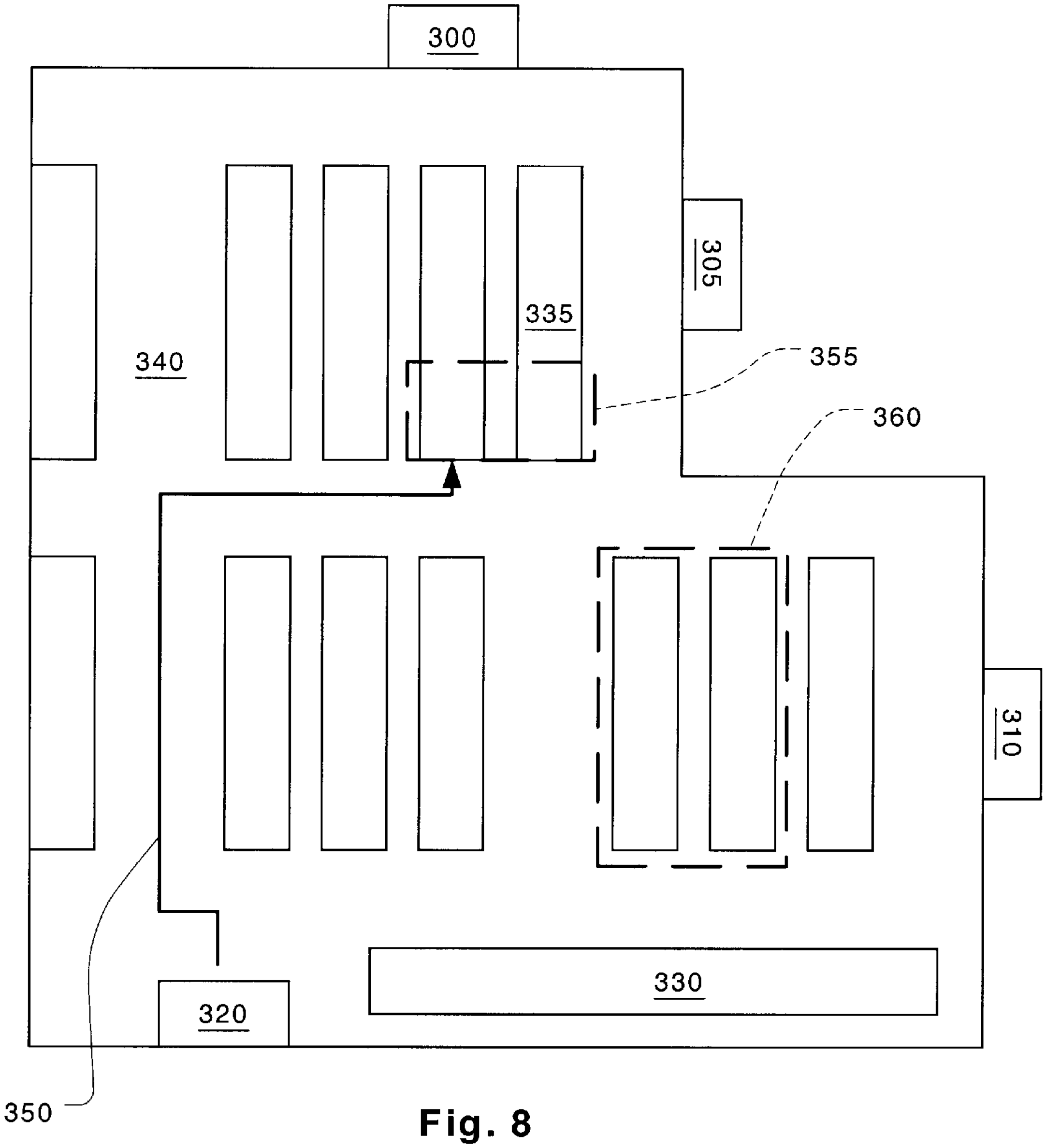
FIG. 8 is an illustration of a map with directions overlaid thereon suitable for displaying or printing for implementing another embodiment of the invention.

Referring to FIG. 7, a map providing directions to an entering vehicle shows various rows of parking spaces at 330, 335, for example. Also drivable ways, such as, at 340, are shown. Entering gates and exit gates are displayed at 300, 305, 310, and 320. The optimal route 350 and parking area 355 are displayed on the map. Note that the area 355 encompasses multiple vehicle spaces. Referring to FIG. 8, in an alternative embodiment, other areas with spaces that represent the next-closest option, are indicated as an alternative 360 to mitigate the situation where no spaces can be found at the recommended area 355.

Figure 9:
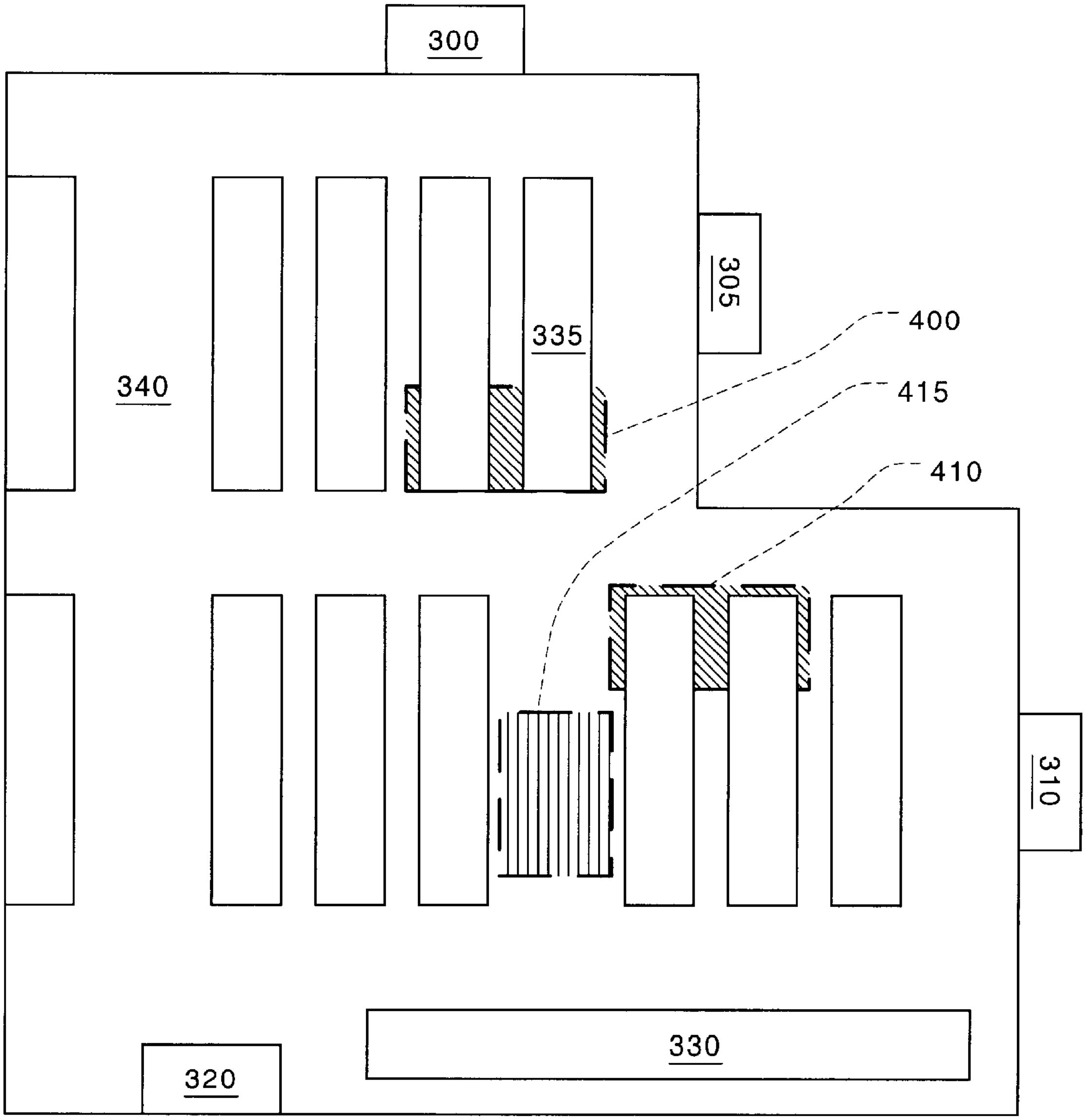
FIG. 9 is an illustration of a map with navigation information overlaid thereon suitable for displaying or printing for implementing yet another embodiment of the invention.

Referring to FIG. 9, another approach to advising a user on parking locations, is to provide a graphic illustration of the traffic patterns and best free parking spaces. For example, areas 400 and 410 may be shaded a color, like green for example, to indicate good parking areas and areas to avoid 415, due, for example, to slow or halted traffic, may be shaded a different color, like red for example. Hatching or other highlighting techniques may be employed. Thus, the optimal and near-optimal free space areas are indicated and the areas to avoid are indicated, but the optimal route to the optimal space areas is not indicated. A user can infer, however, from the map, what routes would be best to take.

Referring now to FIG. 10, yet another alternative map indicates where the available spaces are 420 and 440 and where the areas to avoid are 430 (e.g., due to congested traffic, construction, etc.). The map does not indicate optimal parking locations, but rather, indicates the various destinations using labels 470–480. In this way, the user can intuitively calculate for him/herself what the optimal space and route are. Referring now to FIG. 10A, note that although in the embodiments described above, the free parking areas and congested areas are indicated by shading, other possibilities exist. For example, the occupied spaces 332 may be shown explicitly on the parking rows 330 on the map. Even if the map encompasses a large number of spaces, the density of occupied spaces can be seen rather easily as a dithered pattern, particularly if the occupied spaces 332 are colored-in.

Figure 5:
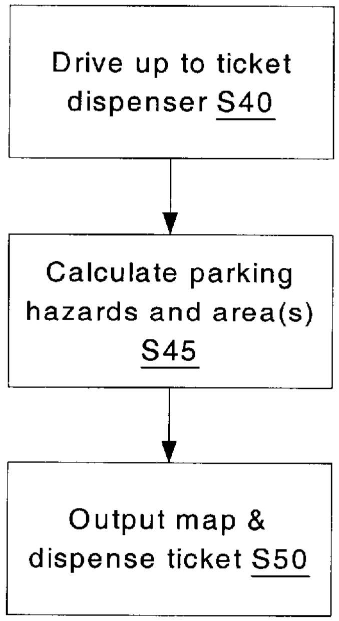
FIG. 5 is a flowchart indicating another procedure for providing a parking assistant according to another embodiment of the invention.

Referring to FIG. 5, according to a control process that is operable with the embodiment of FIG. 10, a driver checks in or receives a ticket at a dispenser S40. The dispenser calculates regions of the parking area with empty spaces and traffic congestion or other obstructions S45 and outputs a map and ticket S50 indicating these.

Figure 11:
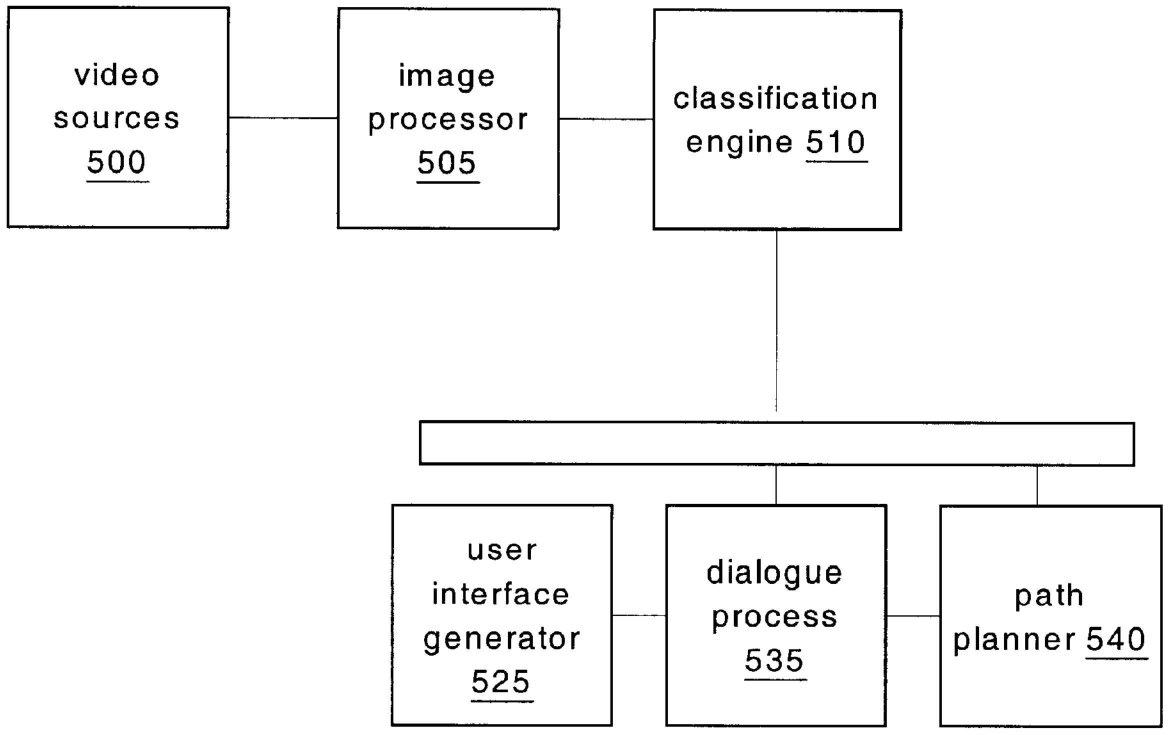
FIG. 11 is a diagram of a control system for implementing an embodiment of the invention.

Referring to FIG. 11, the functional elements of an embodiment of a system that provides data for drivers entering a parking area, is shown. Video sources 500 gather current data and supply these data to an image processor 505. The latter pre-processes the images and video sequences for interpretation by a classification engine 510. In an alternative embodiment, the image processor may utilize a Motion Pictures Expert Group (MPEG) compression process or other compression process that generates statistics from the frames of a video sequence as part of the compression process. These may be used as a surrogate for prediction of crowd density and movement. For example, a motion vector field may be correlated to the number of vehicles in a scene and their velocities and direction of movement. Static image processing is clearly an obvious choice and can be used to identify space occupancy and congestion as well.

The classification engine 510 calculates the number of vehicles in the scene(s) from data from the image processor 505. The classification engine 510 identifies the locations, motion vectors, etc., of each vehicle and generates data indicating these locations according to any desired technique, of which many are known in the prior art. These data are applied to sub-processes that calculate vehicle occupancy, movement, and direction 530. Of course, the roles of these sub-processes may or may not be separate as would be recognized by a person of ordinary skill, and not all may be required in a given implementation. The classification engine 510 may be programmed to further determine the events occurring in the scenes, for example, queues at an exit, vehicles having trouble parking, a vehicle leaving a space versus entering (based, for example, on the motion of the car), congestion, etc. For example, the classification engine 510 may be programmed to recognize queues.

Further, it may be programmed to distinguish masses of vehicles that are moving through an area from masses that are parked in a location.

The results of the classification engine 510 calculations are applied to a dialogue process and a path planner along with external data 515. A dialogue process 535 gathers and outputs the real-time information as appropriate to the circumstance. Route planning may be provided to the dialogue process by a path planning engine 540, which could use techniques, such as, dynamic programming or A* path planning, as discussed above.

As mentioned earlier, the recommendations outputted to drivers entering a parking area, or the route recommendations made, may be based on probabilistic determinations rather than real-time data. For example, the time it takes for a route to be followed may be long enough that the occupancy patterns would change. Also, according to embodiments, the system may provide information to drivers, before they arrive at the parking area. In such cases, the crowding may be predicted based on probabilistic techniques, for example, as described in U.S. Pat. No. 5,712,830 incorporated by reference above. Thus, the system may gather data over extended periods of time (weeks, months, years) and make predictions based on factors such as day of week, season of year, holidays, etc. The system may be programmed from a central location with discount factors based on current external information that are known to affect behavior, such as, the price of gasoline, inflation rate, consumer confidence, etc. Also, the system may receive information about sales and other special events to refine predictions. For example, it would be expected for special store or exhibit events to draw crowds. A store might have a sale or a tradeshow might host a movie star at a particular time and date.

Note that time is not the only criterion that may be used to calculate a cost for the routing alternatives. For some users, the dominant cost may be walking distance or walking time. In such a case, the availability of an alternative means of transportation would affect the costs of the alternative routes. Also note that a route's time and driving and walking distance cost could depend on the frequency of departures, the speed of the transportation, etc. A user could enter information about the relative importance of walking distance or walking time as an inconvenience or comfort issue and the costs of the different alternative routes could be amplified accordingly. Thus, a route that takes more time, but which involves less cost, would be preferred by a user for whom walking distance or walking time is a high cost, irrespective of the time-cost.

A handheld or in-vehicle terminal may provide instructions for a next turn along an optimal driving or walking route. In this case, the handheld terminal (e.g., portable terminal 200, 205) may incorporate a global positioning system (GPS) receiver or some other position-sensing receiver allowing it to provide instructions to the next destination.

Note that although, in the embodiments described above, optimal routing and parking areas were discussed in connection with a graphical output, such as, a map, it is clear that other alternatives may be used. For example, a user can be told where to go through a voice interface. Instructions can be printed in text form, such as: "Turn left at intersection 4 and right at intersection 6, then park."

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for assisting a user in finding a parking space, said method comprising the steps:

imaging at least one scene of a parking venue to produce at least one image;

receiving destination data at a terminal;

calculating, from a result of said imaging, a location of at least two open spaces and calculating an optimal path including at least one of said at least two open spaces to a destination corresponding to said destination data; and outputting at said terminal an indication of said result of said step of calculating.

2. The method as claimed in claim 1, wherein said step of calculating includes the step:

calculating a least-cost path through said destination.

3. The method as claimed in claim 2, wherein said step of calculating a least-cost path includes the steps:

calculating vehicle flow from a result of said imaging; and basing said least-cost path on said vehicle flow.

4. The method as claimed in claim 1, wherein said step of outputting includes generating a map.

5. The method as claimed in claim 1, wherein said step of generating includes generating an output at a fixed terminal.

6. A parking advisor comprising:

means for generating image data corresponding to multiple scenes of a parking area; and a controller having an input for receiving said image data, said controller comprising:

means for determining portions of said parking area containing free parking spaces in response to said image data;

a further input for receiving destination data indicating a destination from a user; and means for calculating and outputting an indication of an optimum route to said portions of said parking area and to said destination.

7. The parking advisor as claimed in claim 6, wherein said indication includes a map.

8. The parking advisor as claimed in claim 6, wherein said indication includes a text or audio message indicating optimum route.

9. A method for recommending areas of free parking in a parking facility, said method comprising the steps:

receiving image data responsive to a scene of a parking area;

detecting locations of free parking spaces in response to said image data;

receiving data indicating a destination;

determining optimal ones of said free parking spaces responsive to said destination in response to said destination and said detected locations of free parking spaces; and outputting a map responsive said step of determining, said map indicating where said optimal ones of said free parking spaces may be found in dependence on said destination.

10. The method as claimed in claim 9, wherein said step of outputting a map includes generating a wireless signal readable by a portable terminal.

* * * * *